United States Patent
Oshiro et al.

(10) Patent No.: US 6,517,171 B2
(45) Date of Patent: Feb. 11, 2003

(54) BRAKING FORCE DISTRIBUTION CONTROL FOR A FOUR WHEEL DRIVE VEHICLE

(75) Inventors: Hiroshi Oshiro, Asahi (JP); Wataru Ozawa, Asahi (JP); Yutaka Tanaka, Asahi (JP); Norihiko Usui, Asahi (JP)

(73) Assignee: Nisshinbo Industries, Inc, Tokyo (JP)

( * ) Notice: Subject to any disclaimer, the term of this patent is extended or adjusted under 35 U.S.C. 154(b) by 0 days.

(21) Appl. No.: 09/725,903

(22) Filed: Nov. 30, 2000

(65) Prior Publication Data

US 2001/0041958 A1 Nov. 15, 2001

(30) Foreign Application Priority Data

Nov. 30, 1999 (JP) .......................................... 11-339965

(51) Int. Cl.[7] ................................................ B60T 8/34
(52) U.S. Cl. .................... 303/113.5; 303/190; 303/194; 303/9.62
(58) Field of Search ................................ 303/190, 194, 303/143, 191, 113.5, 186, 9.62; 701/89, 81

(56) References Cited

U.S. PATENT DOCUMENTS

| | | | | |
|---|---|---|---|---|
| 4,765,433 A | * | 8/1988 | Fujii et al. .................... 180/244 |
| 4,865,396 A | * | 9/1989 | Sato ........................... 303/110 |
| 5,249,849 A | * | 10/1993 | Sakata ......................... 303/100 |
| 5,487,596 A | * | 1/1996 | Negrin ......................... 303/149 |
| 5,615,935 A | * | 4/1997 | Beyer et al. ................... 303/195 |
| 5,634,699 A | * | 6/1997 | Ichikawa et al. ............... 303/150 |
| 5,941,613 A | * | 8/1999 | Tagawa ........................ 303/190 |
| 6,076,898 A | * | 6/2000 | Ota et al. .................... 303/139 |
| 6,301,539 B1 | * | 10/2001 | Janssen et al. ................ 701/70 |

FOREIGN PATENT DOCUMENTS

| | | | |
|---|---|---|---|
| JP | 62-105721 | * | 5/1987 |
| JP | 6-344876 | * | 12/1994 |
| JP | A 9-249109 | | 9/1997 |
| JP | 2000-238630 | * | 9/2000 |

* cited by examiner

Primary Examiner—Jack Lavinder
Assistant Examiner—Bradley King
(74) Attorney, Agent, or Firm—Liniak, Berenato & White

(57) ABSTRACT

A method for braking force distribution control for a vehicle with a direct four wheel drive mode, which does not become an obstacle to an effective braking force and disconcert the driver's feeling. This method relates to a braking force distribution control for a vehicle during direct four wheel drive mode and under the condition that the anti-skid control is inhibited, which does not operate pressure reduction control or the amount of pressure reduction.

3 Claims, 7 Drawing Sheets

BRAKING FORCE DISTRIBUTION CONTROL FOR A FOUR WHEEL DRIVE VEHICLE

BACKGROUND OF INVENTION

1. Field of the Invention

This invention relates to braking force distribution control for a four wheel drive vehicle capable of conducting anti-skid control.

2. Description of Related Art

Conventionally, for a vehicle with a direct four wheel drive mode, when a brake pedal is stepped on to increase the hydraulic pressure of front wheels but decreasing the hydraulic pressure of rear wheels because of the braking force distribution control, a torque T1 acts on the front wheels to stop the wheel rotation while the counter torque acts on a front wheel axle and a rear wheel axle, thereby causing vibration in the drive train as shown in FIG. 7.

This vibration is considerably large and the continuous vibration delays the braking effectiveness resulting in a longer braking distance. This is disconcerting to the driver, and gives an adverse effect on the drive train including differential-related parts and an auto free hub.

SUMMARY AND OBJECT OF THE INVENTION

It is an object of this invention to provide a method for braking force distribution control for a vehicle with a direct four wheel drive mode, which does not become an obstacle to an effective braking force and disconcerts the driver's feeling.

With this invention a method for braking force distribution control for a four wheel drive vehicle is provided. The vehicle uses a direct four wheel drive mode for operating anti-skid control and braking force distribution control. The vehicle has a hydraulic unit comprising a main hydraulic circuit connected between a master cylinder and an inlet valve via a wheel cylinder and an auxiliary hydraulic circuit connected between the wheel cylinder and an auxiliary reservoir via an outlet valve. A wheel speed sensor determines the respective wheel speed, and an electronic control device controls the hydraulic unit, wherein the braking force distribution control for a vehicle during the direct four wheel drive mode, and under the condition that the anti-skid control is inhibited, does not operate pressure reduction control or limit the amount of pressure reduction.

With this invention, a method for braking force distribution control for a four wheel drive vehicle is provided. The vehicle uses a direct four wheel drive mode for operating anti-skid control and braking force distribution control. The vehicle has a hydraulic unit comprising a main hydraulic circuit connected between a master cylinder and an inlet valve via a wheel cylinder and an auxiliary hydraulic circuit connected between the wheel cylinder and an auxiliary reservoir via an outlet valve. A wheel speed sensor determines the respective wheel speed. An electronic control device controls the hydraulic unit, wherein the braking force distribution control during the direct four wheel drive mode and under the condition that the anti-skid control is inhibited operates pressure increase in the brake hydraulic pressure, or normal brake hydraulic pressure increase if vehicle vibration is detected.

BRIEF DESCRIPTION OF THE DRAWINGS

The above and other objects of the present invention will become readily apparent by reference to the following detailed description when considered in conjunction with the accompanying drawings wherein.

DETAILED DESCRIPTION OF THE INVENTION

In the following sections, an embodiment of this invention is explained with reference to the drawings.

A four wheel drive vehicle has a various driving modes, and a direct four wheel drive mode is one of them. Under the four wheel drive mode, a front wheel axle and a rear wheel axle are mechanically connected (directly geared), i.e., a rigid four wheel drive. For example, a four wheel drive mode for a part-time four wheel derive vehicle is considered to be categorized in the rigid four wheel derive. Therefore, if the counter torque acts on the front wheel axle and the rear wheel axle, vibration is caused on the wheels.

Figure 1:
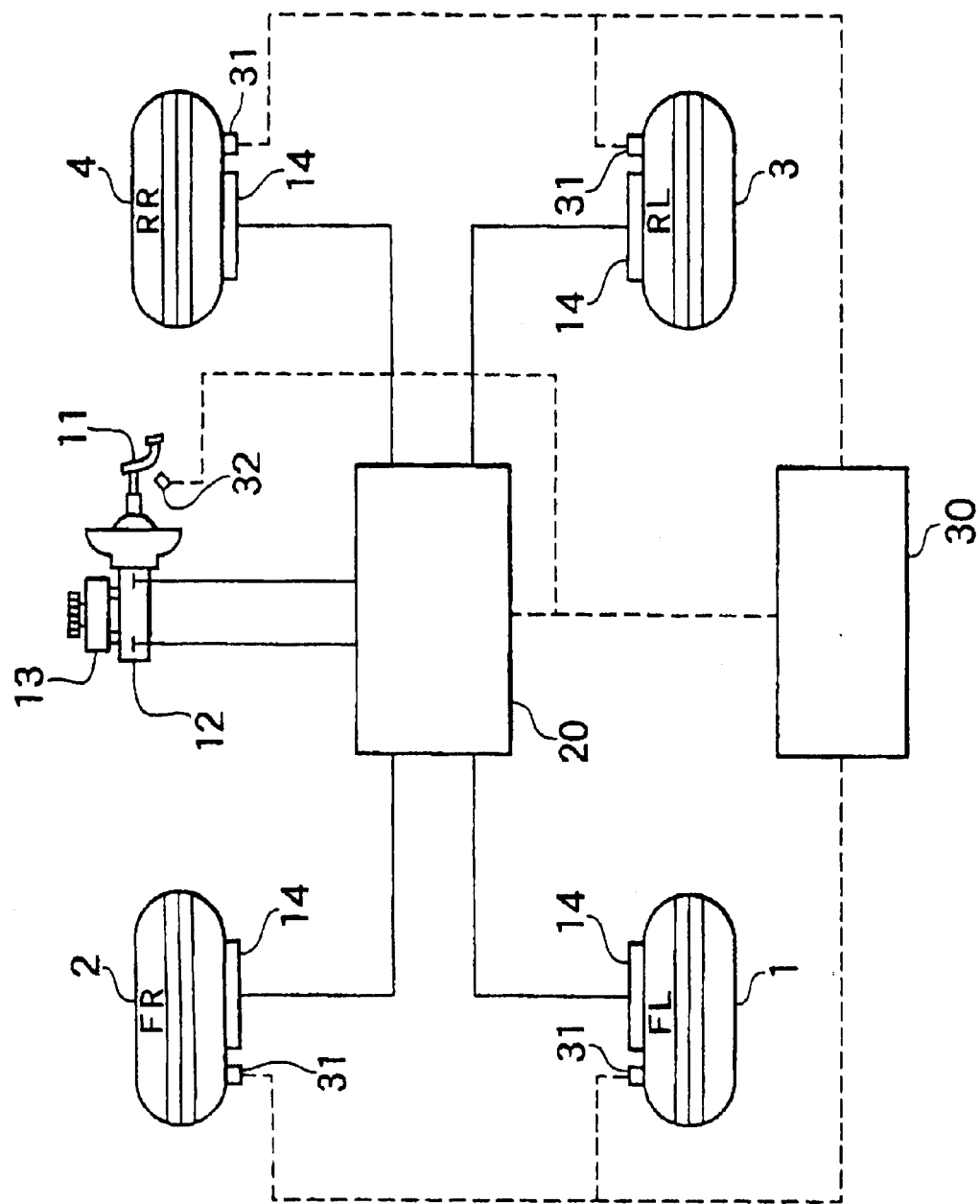
FIG. 1 is a schematic view of the brake control device.

In a brake hydraulic device for a motor vehicle, hydraulic pressure generated in a hydraulic unit 20 is supplied to the respective wheel cylinder 14 for the respective front and rear wheels as shown in FIG. 1 so as to conduct brake control on a left front wheel 1, a right front wheel 2, a left rear wheel 3, and a right rear wheel 4. For example, regarding the brake control such as anti-lock brake control system (ABS), braking force distribution control system, and vehicle behavior control system, an electronic control device 30 controls the hydraulic unit 20 based on signals from a wheel speed sensor 31 and a brake switch 32 in order to provide an appropriate and preferable brake control. Here, the electronic control device 30 may be comprised of special hardware and general computing members such as microcomputers.

Figure 2:
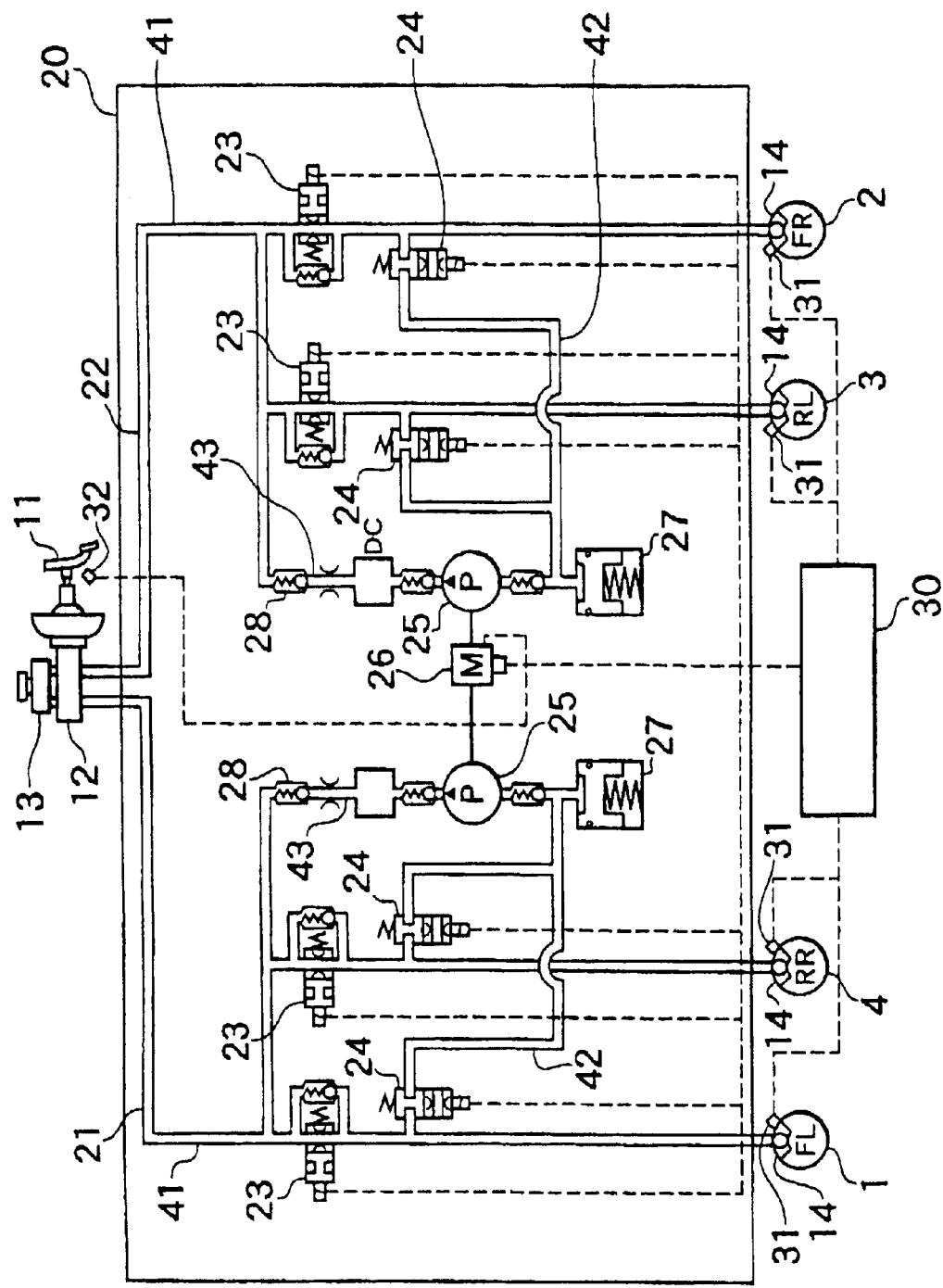
FIG. 2 is a view explaining the braking force distribution control when the pressure reduction is being inhibited.

FIG. 2 shows one example of the hydraulic unit 20 which is equipped with a hydraulic circuit for brake control such as the anti-lock brake control system (ABS), the braking force distribution control system, and the vehicle behavior control system. Furthermore, FIG. 2 is an example of an X-piping, wherein the left front wheel 1 and the right rear wheel 4 are connected to a first hydraulic circuit 21 at one side and the right front wheel 2 and the left rear wheel 3 are connected to an independent second hydraulic circuit 22 at the other side.

The hydraulic unit 20 comprises a main hydraulic circuit 41 connecting a master cylinder 12 and a wheel cylinder 14 via an inlet valve 23, an auxiliary hydraulic circuit 42 connecting the wheel cylinder 14, and a return hydraulic circuit 43 returning the hydraulic pressure from the auxiliary reservoir 27 to the main hydraulic circuit 41 via the pump 25, thereby controlling to open or close the inlet valve 23 and the outlet valve 24 for conducting the predetermined brake control on the respective wheel. Further, the main reservoir 13 reserves the brake fluid, a check valve 28 prevents the reverse flow, and a motor 26 drives and controls the pump 25.

Braking operation is explained next.

The electronic control device 30 determines the brake control. For example in FIG 3, the control device 30 uses signals from sensors such as a wheel speed sensor 31. First, the electronic control device 30 is initialized and determines the wheel speed based on the signals from the wheel speed sensor 31. The deceleration of right and left front wheels are determined based on the information regarding the right and left wheel speed. Brake hydraulic pressure in the wheel cylinder of right and left front wheels is determined based on signals from the hydraulic pressure measurement sensor or the information from the hydraulic control of the hydraulic unit. An estimated vehicle speed and an estimate vehicle deceleration are determined based on the information from the respective wheel speed. A type of brake control mode is determined. If an anti-lock control mode is selected, the anti-lock brake control is conducted, but if the anti-lock brake control mode is not selected, normal brake control is conducted.

In normal braking, if a brake pedal 11 is stepped on, the brake hydraulic is generated in the master cylinder 12, and the inlet valve 23 is open while the outlet valve is closed. Then, the brake hydraulic pressure generated in the master cylinder 12 is directly supplied to the wheel cylinder 14, thereby effectuating the brake on the wheels 1, 2, 3, 4.

For example, the electronic control device 30 conducts anti-lock brake control by controlling opening and closing of the inlet valve 23 and the outlet valve 24 and controlling the driving of the pump 25.

Anti-lock brake control controls the brake hydraulic pressure by repeating a pressure increase mode, a pressure hold mode, and a pressure decrease mode in every cycle. For example the pressure increase mode in one cycle conducts open-close control on the inlet valve 23, closes the outlet valve 24, and increases the hydraulic pressure in the wheel cylinder 14.

If there is a failure found in the hydraulic unit or the electronic control device because of the failure found in a wheel speed sensor, the failure found in a pump motor, the failure found in the inlet valve or the outlet valve, or the failure due to an excessively high or low line source, the anti-lock brake control is stopped.

Braking force distribution control is explained next.

Figure 3:
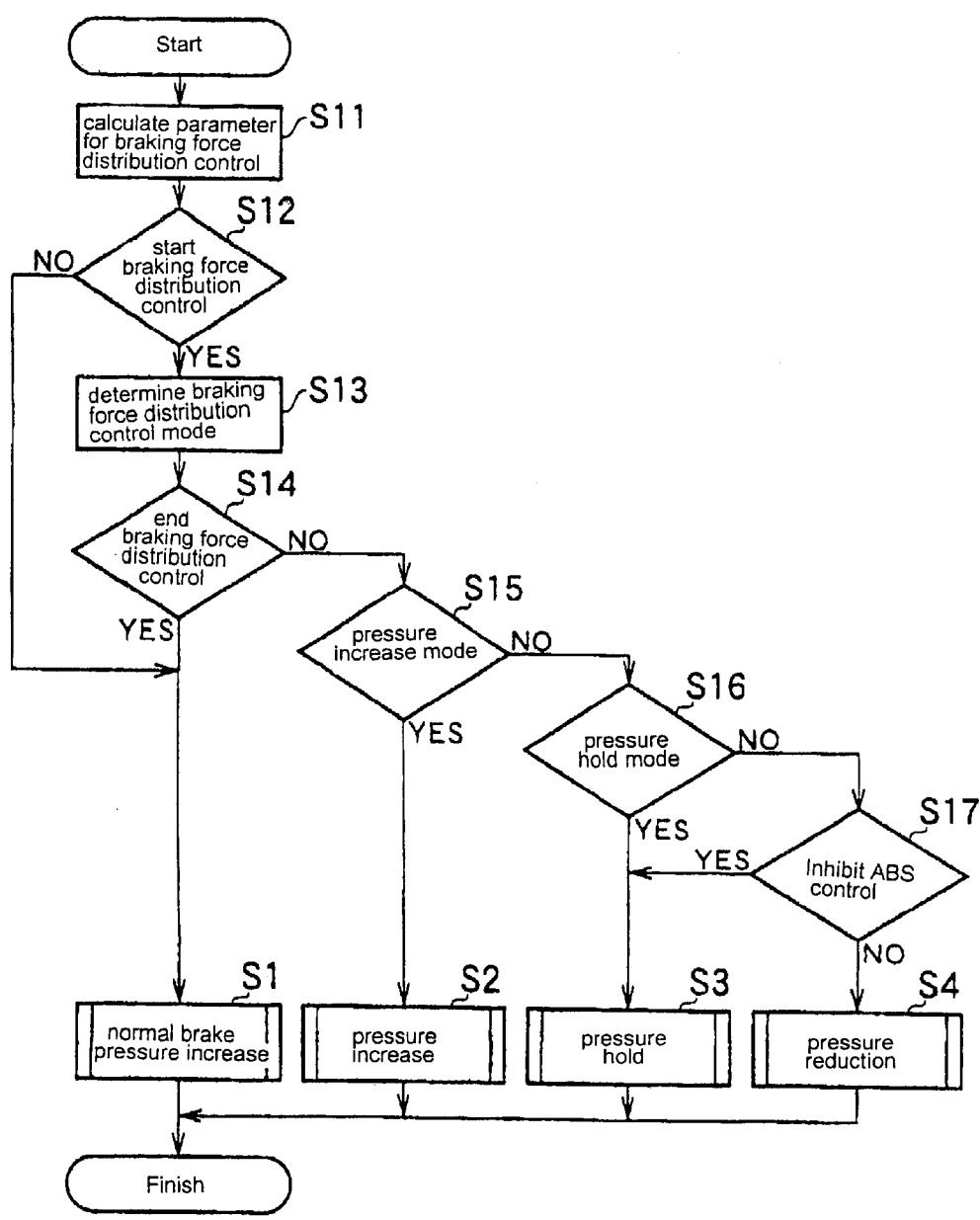
FIG. 3 is a flowchart of the braking force distribution control restricting the pressure reduction.

For example in FIG. 3, inhibiting the pressure reduction under the braking force distribution control is stated with determining braking force distribution control parameters in a Step 11 (S11), and whether braking force distribution control is initiated is determined based on the parameters in a Step 12 (S12). For example, the parameters can be the front wheel axle deceleration and the rear wheel axle deceleration. If the braking force distribution control is initiated, the braking force distribution control mode is judged in a Step 13. Then, whether to stop the braking force distribution control is determined in a Step 14 (S14). If the braking force distribution control is to be stopped or is not to be initiated, the normal brake pressure increase is conducted in the Step 1 (S1).

If the braking force distribution control is not stopped, either the pressure increase mode, the pressure hold mode, or the pressure decrease mode is selected depending upon the vehicle behavior and the condition. That is, whether the pressure increase mode is in motion or not is determined in a Step 15 (S15), and if the pressure increase mode is in motion, pressure is increased in the Step 2 (S2). However, if the pressure increase mode is not in motion, whether the pressure hold mode is in motion in the Step 3 (S3) is determined, and if the pressure hold mode is in motion, the hydraulic pressure is held in the Step 3 (S3). However, if the pressure hold mode is not in motion, whether the anti-lock brake control is being inhibited is determined in a Step 17 (S17), and if the anti-lock brake control is being inhibited, the hydraulic pressure is held in the Step 3 (S4). However, the anti-lock brake control is not being inhibited, the hydraulic pressure is reduced in the Step 4 (S4).

Accordingly, in the case when the anti-lock brake control is being inhibited, the hydraulic pressure is not to be reduced but to be held, and there is no counter torque acted on the front wheel axle and the rear wheel axle directly geared, thereby eliminating the possibility of causing the problematic vibration.

Figure 4:
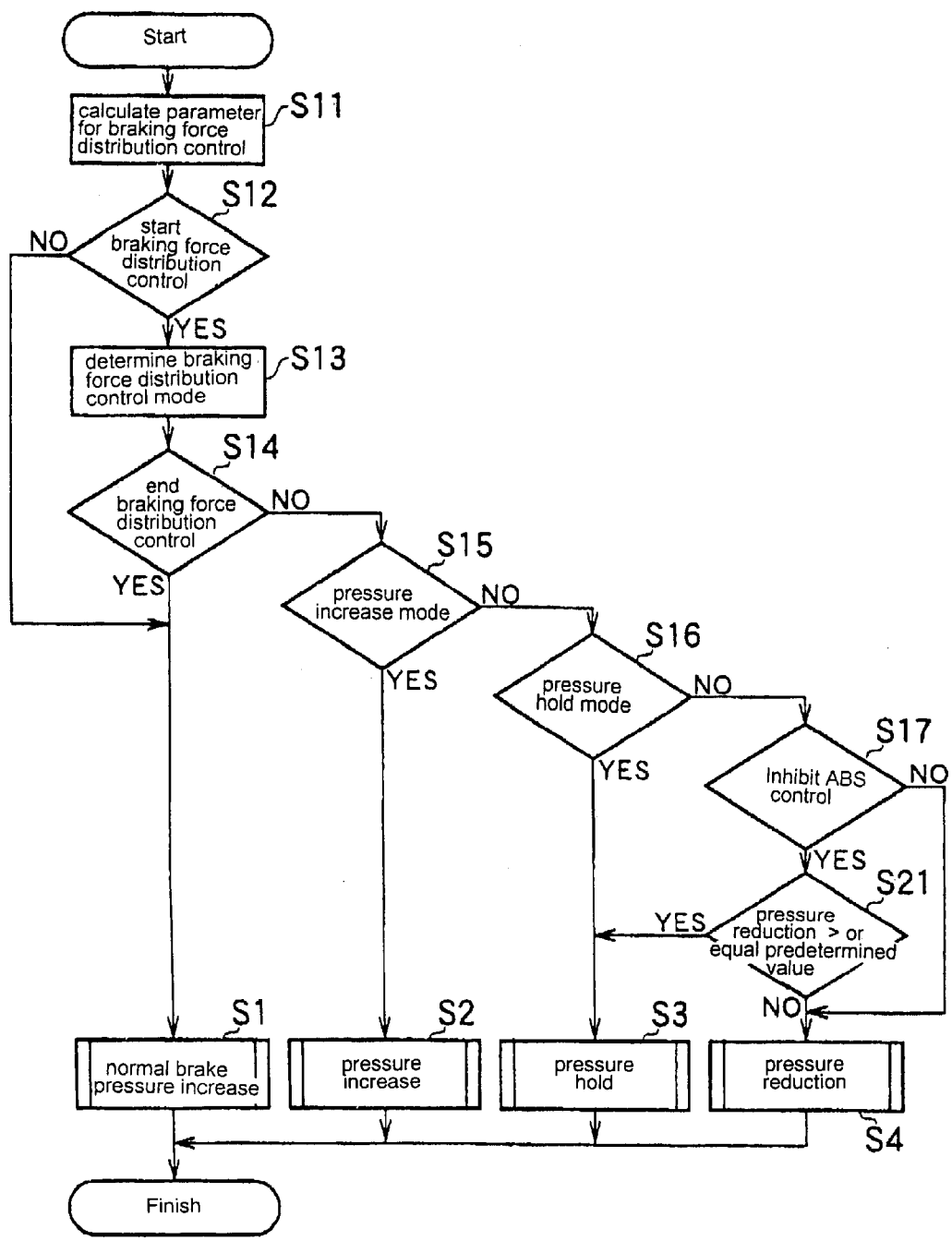
FIG. 4 is a flowchart of the braking force distribution control restricting the amount of the pressure reduction.

For example, the braking force distribution control restricting the amount of pressure reduction is shown in FIG. 4. The steps to be described here are covered by the description of the FIG. 3 above; therefore, the explanation of the same steps are omitted here.

When whether the anti-lock brake control is being inhibited or not is determined in the S17, if the anti-lock brake control is being inhibited, whether the amount of the pressure reduction is larger than a predetermined amount is determined in a Step 21 (S21). If the amount of the pressure reduction is larger than the predetermined amount, the hydraulic pressure is to be held in the S3.

If the anti-lock brake control is not being inhibited in the S17 or the amount of the pressure reduction is smaller than the predetermined amount in the S21, the hydraulic pressure is reduced in the S4.

If the anti-lock brake control is being inhibited and the amount of the pressure reduction is larger than the predetermined amount, the hydraulic pressure is to be held to precisely prevent the causation of the vibration.

Figure 5:
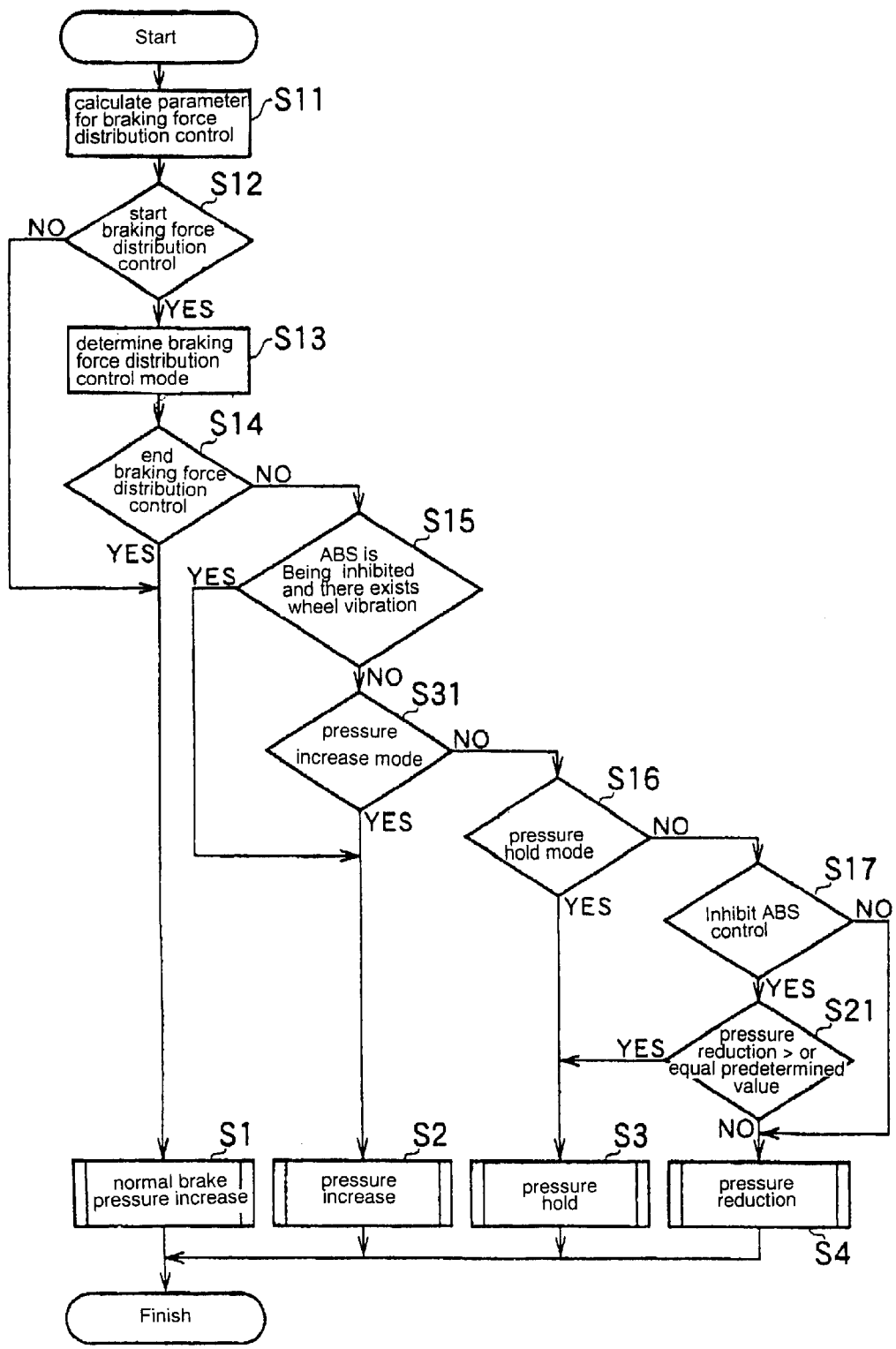
FIG. 5 is a flowchart of the braking force distribution control when the wheel vibration is detected.

For example, FIG. 5 shows when the braking force distribution control recognizes the wheel vibration. Here, FIG. 3 and FIG. 4 already explained the inhibition of the pressure decrease and the restriction of the amount of the pressure reduction, and the same steps there and the explanation of which will be omitted.

If, in the Step 14 (S14), it is determined that the braking force distribution control is not being stopped, whether the anti-lock brake control is being inhibited and there is wheel vibration are determined in the Step 15 (S15). If there is wheel vibration, the hydraulic pressure is increased, while if there is no wheel vibration, the steps described above referring to FIG. 3 and FIG. 4, where the pressure reduction is inhibited and the amount of the pressure reduction is restricted, are conducted. Here, whether there is the wheel vibration or not is checked by the level of acceleration of the wheels, vibration frequency, and so on.

Figure 6:
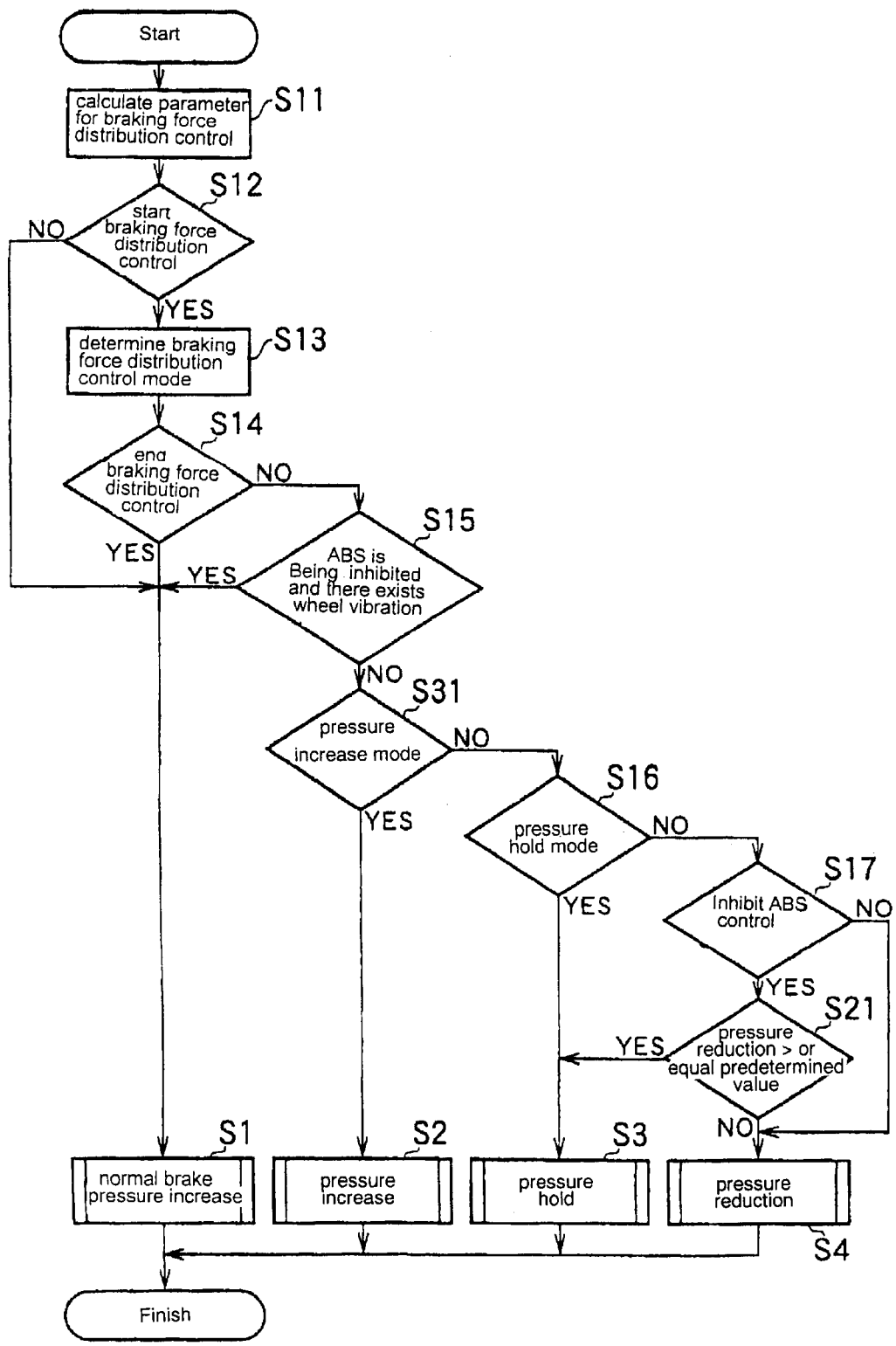
FIG. 6 is a flowchart of another braking force distribution control when the wheel vibration is detected.
Figure 7:
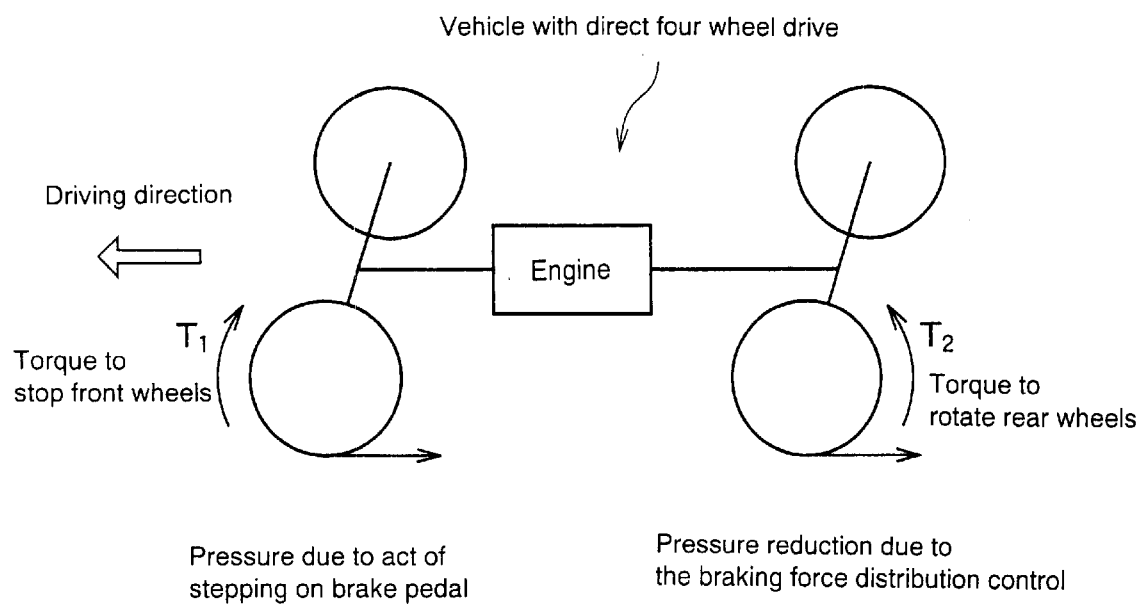
FIG. 7 is a view explaining the wheel vibration while in the direct four wheel drive mode.

For example, FIG. 6 shows when another braking force distribution control recognizes the wheel vibration. In the S15 of the braking force distribution control shown in FIG. 5, if the anti-lock brake control is being inhibited and there is wheel vibration, normal brake pressure increase is conducted in S15.

Accordingly, if the anti-lock brake control is being inhibited and there is wheel vibration, the vibration is prevented by increasing the hydraulic pressure.

This invention has the following advantages.

This invention provides braking force distribution control which prevents a various problems occur in a direct four wheel drive mode, such as the wheel vibration caused during the braking force distribution control, disconcerting feeling due to the vibration, and a failure in the drive train (e.g., deferential-related section, and auto free hub).

This invention provides stable braking control without an extra or special switch for the recognition of the direct four wheel drive mode and provides stable braking control even if the switch fails.

It is readily apparent that the above-described embodiments have the advantage of wide commercial utility. It should be understood that the specific form of the invention hereinabove described is intended to be representative only, as certain modifications within the scope of these teachings will be apparent to those skilled in the art.

What is claimed is:

1. A method for braking force distribution control for a four wheel device vehicle, said vehicle uses a direct four wheel drive mode for operating anti-skid control and braking force distribution control, said vehicle has a hydraulic unit comprising a main hydraulic circuit connected between a master cylinder and an inlet valve via a wheel cylinder and an auxiliary hydraulic circuit connected between said wheel cylinder and an auxiliary reservoir via an outlet valve, a wheel speed sensor determined respective wheel speed of each of four wheels of said four wheel drive vehicle, and an electronic control device to control said hydraulic unit, wherein said braking force distribution control for the vehicle, during said direct four wheel drive mode and under a condition that said anti-skid control is stopped, does not operate pressure reduction control.

2. A method for braking force distribution control for a four wheel drive vehicle, said vehicle uses a direct four wheel drive mode for operating anti-skid control and braking force distribution control, said vehicle has a hydraulic unit comprising a main hydraulic circuit connected between a master cylinder and an inlet valve via a wheel cylinder and an auxiliary hydraulic circuit connected between said wheel cylinder and an auxiliary reservoir via an outlet valve, a wheel speed sensor determines respective wheel speed of each of four wheels of said four wheel drive vehicle, and an electronic control device to control said hydraulic unit, wherein during said direct four wheel drive mode and under a condition that said anti-skid control is stopped, said braking force distribution control for the vehicle increases pressure in said hydraulic unit if wheel vibration is detected.

3. A method for braking force distribution control for a four wheel drive vehicle, said vehicle uses a direct four wheel drive mode for operating anti-skid control and braking force distribution control, said vehicle has a hydraulic unit comprising a main hydraulic circuit connected between a master cylinder and an inlet valve via a wheel cylinder and an auxiliary hydraulic circuit connected between said wheel cylinder and an auxiliary reservoir via an outlet valve, a wheel speed sensor determines respective wheel speed of each of four wheels of said four wheel drive vehicle, and an electronic control device to control said hydraulic unit, wherein said braking force distribution control for the vehicle, during said direct four wheel drive mode and under a condition that said anti-skid control is stopped, limits an amount of pressure reduction in said hydraulic unit.

* * * * *